United States Patent [19]

Mowka, Jr. et al.

[11] Patent Number: 5,011,600

[45] Date of Patent: Apr. 30, 1991

[54] WATER FILTRATION SYSTEM FOR AQUARIUMS

[75] Inventors: Edmund J. Mowka, Jr.; Thomas A. Frakes; Larry M. Pettengill, all of Mentor, Ohio

[73] Assignee: Aquarium Systems, Inc., Mentor, Ohio

[21] Appl. No.: 366,591

[22] Filed: Jun. 14, 1989

[51] Int. Cl.⁵ ............................................. A01K 63/04
[52] U.S. Cl. .................................. 210/169; 210/416.2
[58] Field of Search ............................. 210/169, 416.2

[56] References Cited

U.S. PATENT DOCUMENTS 4,802,980 2/1989 Gilkey et al. ........................ 210/169
4,894,151 1/1990 Woltmann .......................... 210/169

Primary Examiner—Stanley Silverman
Assistant Examiner—Robert A. Simpson
Attorney, Agent, or Firm—Renner, Otto, Boisselle & Sklar

[57] ABSTRACT

A water filtration system includes an auxiliary filter assembly having a single inlet connected to the water lift tube of an undergravel filter and an outlet connected to a submersible electric water pump which causes the water within an aquarium to flow through both the undergravel filter and auxiliary filter assembly before being recirculated back into the aquarium.

8 Claims, 2 Drawing Sheets

WATER FILTRATION SYSTEM FOR AQUARIUMS

BACKGROUND OF THE INVENTION

This invention relates generally, as indicated, to a water filtration system for aquariums, and more particularly, to a system for providing auxiliary filtration of the water passing through an undergravel filter within an aquarium.

Filters of various types are commonly used for filtering out impurities from the water in an aquarium which might otherwise be injurious or fatal to the aquatic life in the aquarium. One such filter consists of a canister filled with a suitable filter media, with openings in the sides of the canister through which water is continuously drawn by a submersible electric pump connected to the canister outlet for recirculation in the aquarium.

Another filter in widespread use is an undergravel filter having a lift tube extending upwardly therefrom containing an air lift device or connected to a water pump which causes the water to flow through the undergravel filter and out through the lift tube for recirculation in the aquarium. If sized properly, such an undergravel filter should be fairly effective in keeping impurities in the water at a safe level. However, it would be advantageous to provide for additional filtering of the water as it is circulated through an undergravel filter.

SUMMARY OF THE INVENTION

With the foregoing in mind, it is a principal object of this invention to provide a water filtration system which causes auxiliary filtration of the water being circulated through an undergravel filter before the water is recirculated in the aquarium. To that end, the water filtration system of the present invention includes an auxiliary filter assembly having a single inlet connected to an undergravel filter lift tube and an outlet connected to a submersible electric pump which causes the water to flow through both the undergravel filter and auxiliary filter assembly before being recirculated back into the aquarium. The single inlet to the auxiliary filter assembly may include an adaptor to facilitate attachment of the auxiliary filter assembly to lift tubes of different diameters. During installation, the upper end of the lift tube may be cut to a length such that when the pump and auxiliary filter assembly are connected to the lift tube, the pump discharge opening is slightly below the surface of the water in the aquarium.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

DETAILED DESCRIPTION OF THE PREFERRED EMBODIMENT

Figure 1:
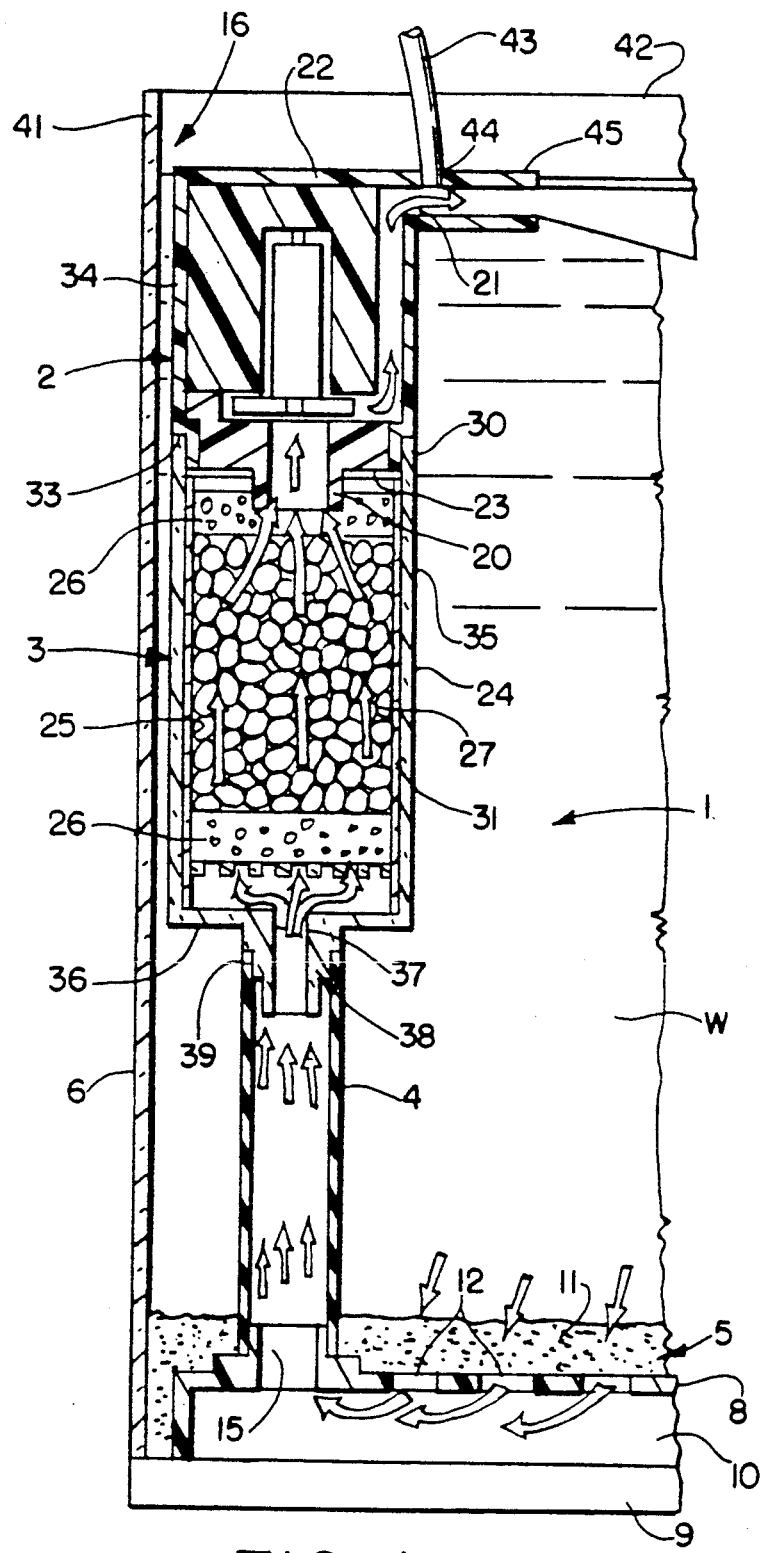
FIG. 1 is a fragmentary longitudinal section through a preferred form of water filtration system in accordance with this invention shown installed within an aquarium.

Referring now in detail to the drawings, and initially to FIG. 1, there is schematically shown a preferred form of water filtration system 1 in accordance with this invention including a submersible electric water pump 2 and auxiliary filter assembly 3 connected in series with a water lift tube 4 of an undergravel filter 5 disposed within an aquarium tank 6. The undergravel filter 5 may be of conventional type, including an apertured filter plate 8 adjacent to but vertically spaced from the bottom 9 of the tank to define a filtered water chamber 10 therebetween. The filter plate 8 is covered by a suitable filtrant 11 which filters impurities out of the water W as the water passes through the filtrant 11 and apertures 12 in the filter plate 8.

Lift tube 4 is suitably connected to an opening 15 in the filter plate 8 which is preferably near a corner 16 of the aquarium 6 where the lift tube 4 is less unsightly, and to make it more convenient to connect the submersible electric water pump 2 and auxiliary filter assembly 3 to the lift tube 4 to cause the water within the aquarium to continuously circulate through the undergravel filter 5 and auxiliary filter assembly 3 as described hereafter.

Figure 2:
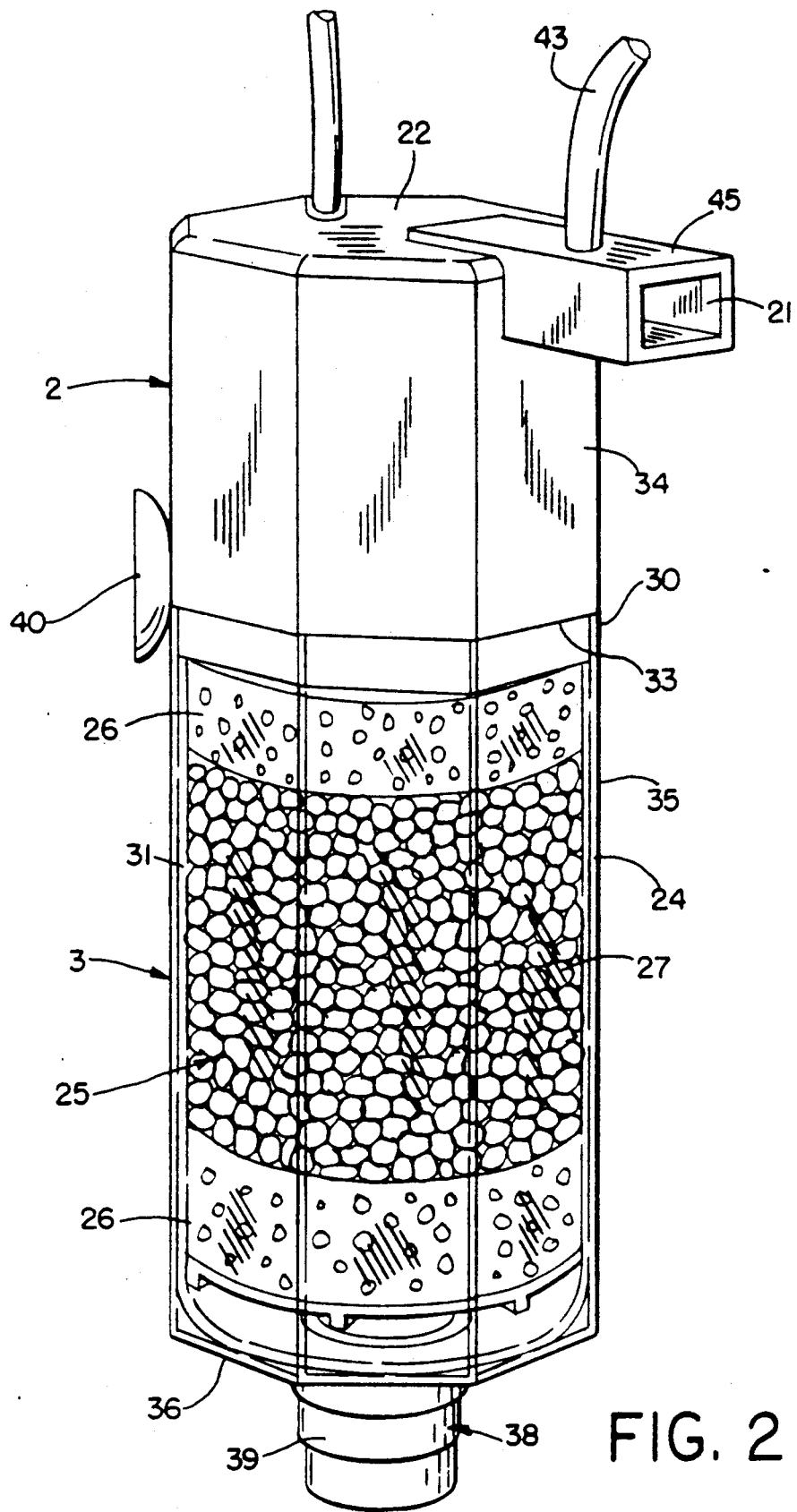
FIG. 2 is an enlarged perspective view of a preferred form of submersible water pump and auxiliary filter assembly utilized in the water filtration system of FIG. 1.

Referring further to FIG. 1 and also to the pump and auxiliary filter assembly enlargement of FIG. 2, the submersible water pump 2 includes a bottom water inlet 20 and side water outlet 21 adjacent the top 22 of the pump. Connected to the pump bottom 23 in surrounding relation to the pump inlet 20 is the auxiliary filter assembly 3 which includes a filter canister or casing 24 containing filter media 25. While filter media of various types may be used, in the preferred embodiment disclosed herein, the filter media 25 desirably consists of two layers of foam material 26 with a layer of carbon 27 interposed therebetween. Regardless of what type of filter media is used, the surface area of the filter media 25 is desirably substantially greater than the surface area of the pump inlet 20 in order to achieve the desired auxiliary filtering of the water passing through the filter 3. As an example, the pump inlet 20 may have an inner diameter of approximately $\frac{3}{4}$ inch and the filter media 25 have a diameter of approximately $2\frac{1}{4}$ inches.

The upper end 30 of the filter casing 24 is desirably completely open to facilitate insertion and removal of the filter media 25 from the casing. Also, the filter casing 24 may be lined with a cylindrical liner 31 having a cross sectional area substantially corresponding to the area of the filter media 25. After the casing 24 has been filled with the desired filter media 25, the auxiliary filter assembly 3 may be attached to the pump 2 by inserting the open end 30 of casing 24 over an external stepped shoulder 33 adjacent the bottom 23 of the pump housing 34 located radially outwardly of the pump inlet 20 which completely closes such open end 30. The frictional contact between the casing 24 and pump housing 34 may be sufficient to retain the auxiliary filter assembly 3 on the pump 2, or other suitable retention means may be used as desired.

Moreover, the filter casing 24 is desirably made of a clear plastic material, with flow passages only in the ends of the casing and not in the sides 35. The upper end 30 of the casing 24 is desirably completely open as previously described, whereas the lower end (bottom) 36 of the casing has a single inlet opening 37 therein which is desirably substantially the same size as the pump inlet 20 (in this case approximately ¾ inch). Surrounding the inlet opening 37 is an adaptor 38 which may have an external tapered or stepped surface 39 to facilitate insertion into lift tubes 4 of different internal diameters (which typically vary from 1 inch to 1¼ inches).

During installation of the water filtration system 1, the lift tube 4 is desirably cut to a length such that when the filter adaptor 38 is inserted into the upper end of the lift tube 4, the top of the pump outlet 21 is just below the water surface in the aquarium 6 as schematically shown in FIG. 1, for example, approximately ¼ inch below the water surface. To further support the pump 2 and auxiliary filter assembly 3 within the aquarium 6, one or more suction cups 40 (see FIG. 2) may be provided on the exterior of the pump housing 34 for attachment to the walls 41, 42 of the aquarium at the corner 16.

To operate the water filtration system 1, the electric pump 2 is turned on, which causes water to be drawn downwardly through the undergravel filter 5 and upwardly through the lift tube 4 and auxiliary filter assembly 3 prior to being discharged through the pump outlet 21 back into the aquarium. During such water movement, the water passing through the pump 2 may be aerated by connecting an air hose 43 extending out of the water to an opening 44 in a nozzle 45 surrounding the pump outlet 21.

From the foregoing, it will now be apparent that the water filtration system of the present invention provides for auxiliary filtration of the water passing through the undergravel filter before the water is recirculated back into the aquarium.

Although the invention has been shown and described with respect to a certain preferred embodiment, it is obvious that equivalent alterations and modifications will occur to others skilled in the art upon the reading and understanding of the specification. The present invention includes all such equivalent alterations and modifications, and is limited only by the scope of the claims.

What is claimed is:

1. A filtration system for aquariums comprising a submersible electric water pump having a bottom pump inlet and a top pump outlet, a filter assembly, and undergravel filter means having a water lift tube extending upwardly therefrom, said filter assembly comprising a casing containing filter media, said casing having a casing outlet in one end in communication with said pump inlet, a single casing inlet in another end axially spaced from said one end, and means for releaseably connecting said single casing inlet to an upper open end of said water lift tube, said casing having a greater transverse cross-sectional interior area containing said filter media than the transverse internal cross-sectional area of said water lift tube.

2. The filtration system of claim 1 wherein said casing and said water lift tube are generally cylindrical, and said casing has a greater internal diameter than said water lift tube.

3. The filtration system of claim 2 wherein the internal diameter of said casing is approximately 2¼ inches, and the internal diameter of said water lift tube is between approximately 1 inch and 1¼ inches.

4. The filtration system of claim 1 wherein said means for connecting said single casing inlet to said upper open end of said water lift tube comprises adaptor means extending from said single casing inlet into said upper open end of said lift tube means.

5. The filtration system of claim 4 wherein said adaptor means has an external stepped surface for insertion into different diameter water lift tubes.

6. The filtration system of claim 1 wherein said casing is completely open at said one end to facilitate filling of said casing with said filter media, said one end being engageable with an external stepped shoulder on said pump radially outwardly of said pump inlet.

7. The filtration system of claim 6 wherein said filter media comprises a pair of foam layers separated by a carbon layer.

8. The filtration system of claim 1 wherein the combined height of said undergravel filter means, water lift tube, filter assembly and water pump is such that said pump outlet is located just below the surface of the water in an aquarium.

* * * * *